March 13, 1934.  A. H. MIDGLEY  1,950,859
APPARATUS FOR PRODUCING SOUNDS OF A MUSICAL CHARACTER
Filed May 31, 1932  7 Sheets-Sheet 1
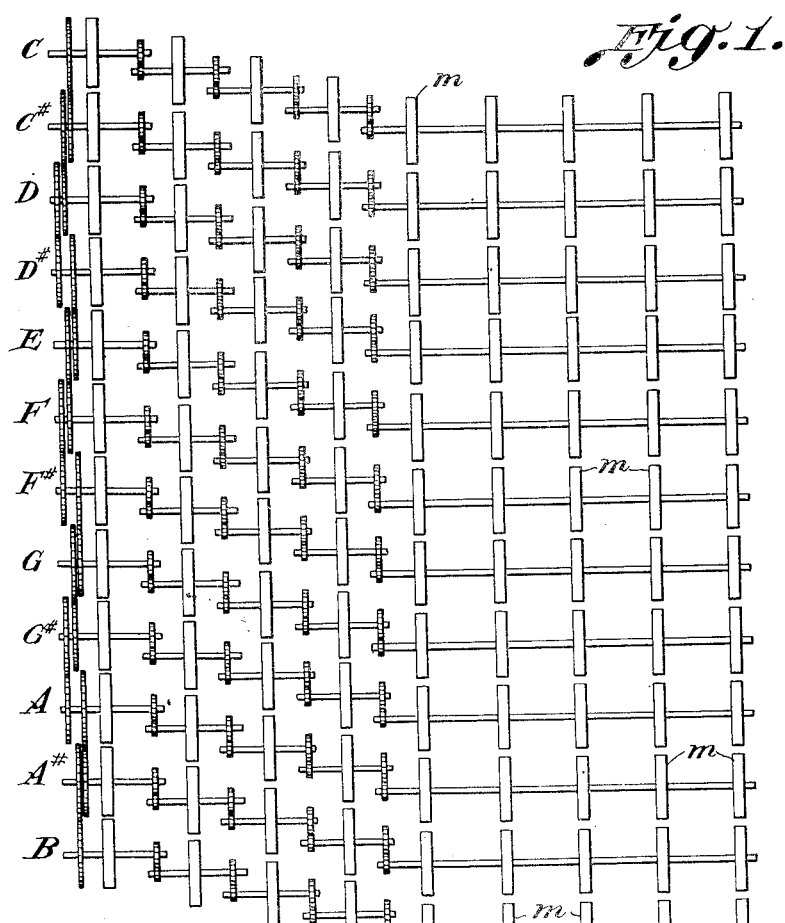
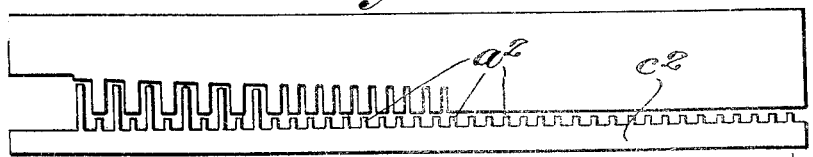
A. H. Midgley
INVENTOR
By: Marks & Clerk
Attys.

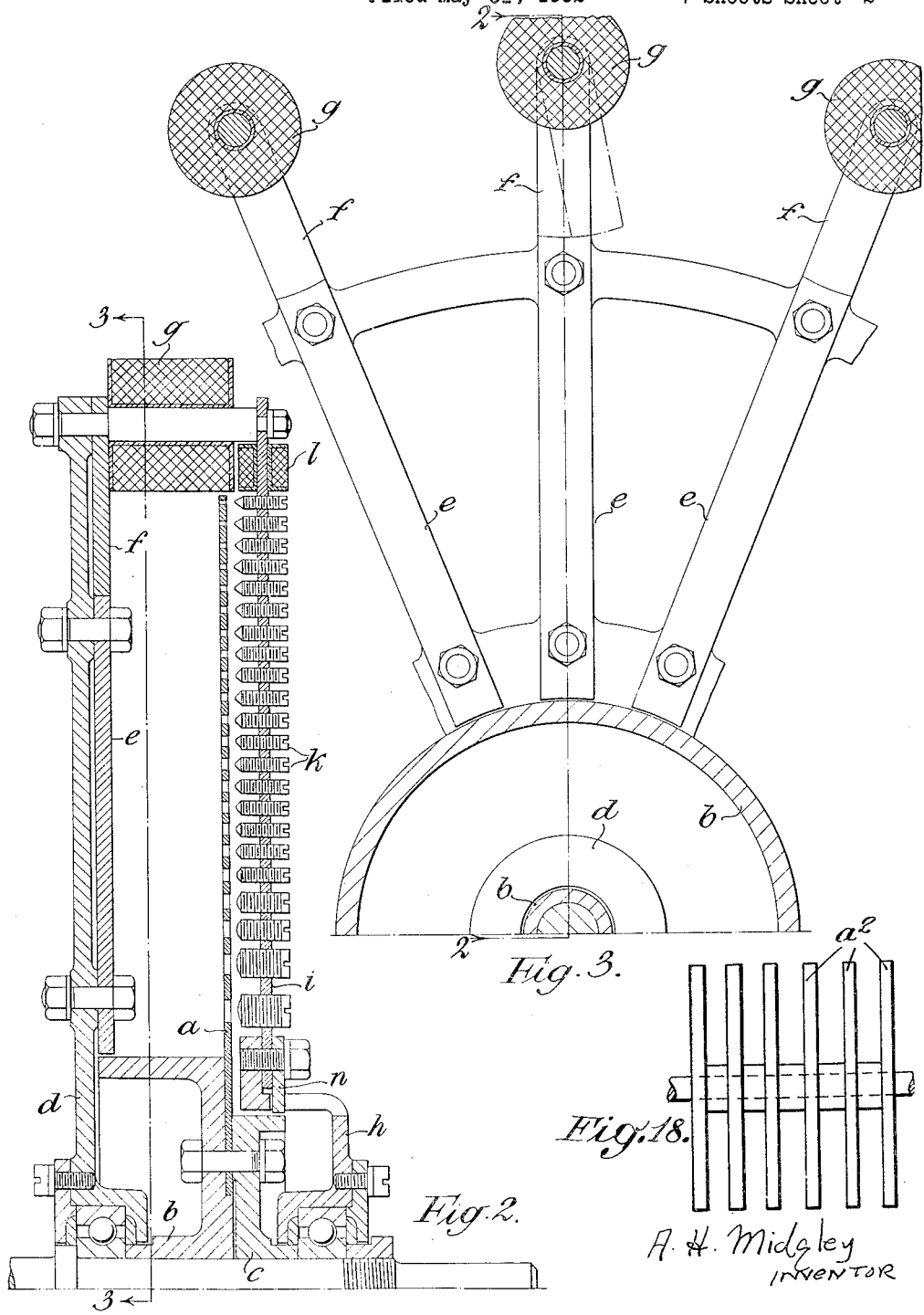

March 13, 1934. A. H. MIDGLEY 1,950,859
APPARATUS FOR PRODUCING SOUNDS OF A MUSICAL CHARACTER
Filed May 31, 1932 7 Sheets-Sheet 3

A. H. Midgley
INVENTOR
By: Marks & Clerk
Attys.

March 13, 1934.  A. H. MIDGLEY  1,950,859
APPARATUS FOR PRODUCING SOUNDS OF A MUSICAL CHARACTER
Filed May 31, 1932  7 Sheets-Sheet 4

A. H. Midgley
INVENTOR

By: Marks&Clerk
ATTYS.

March 13, 1934.   A. H. MIDGLEY   1,950,859
APPARATUS FOR PRODUCING SOUNDS OF A MUSICAL CHARACTER
Filed May 31, 1932   7 Sheets-Sheet 5
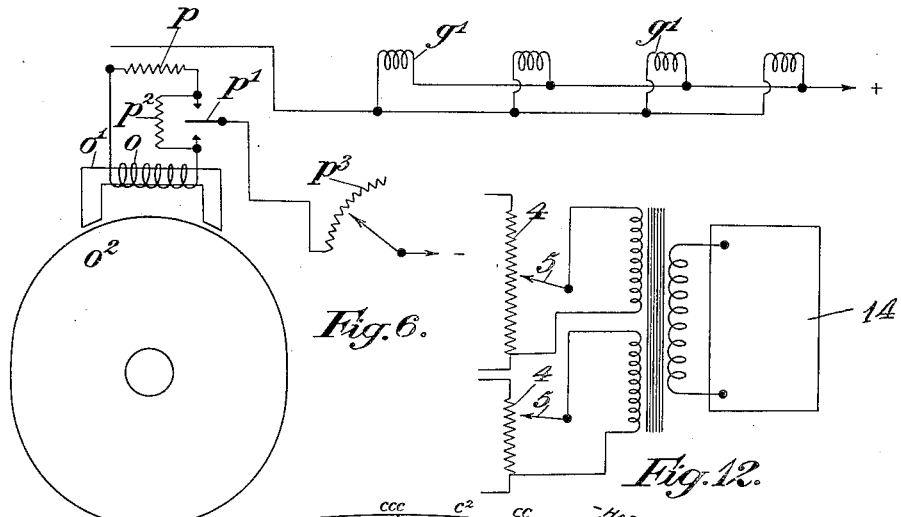
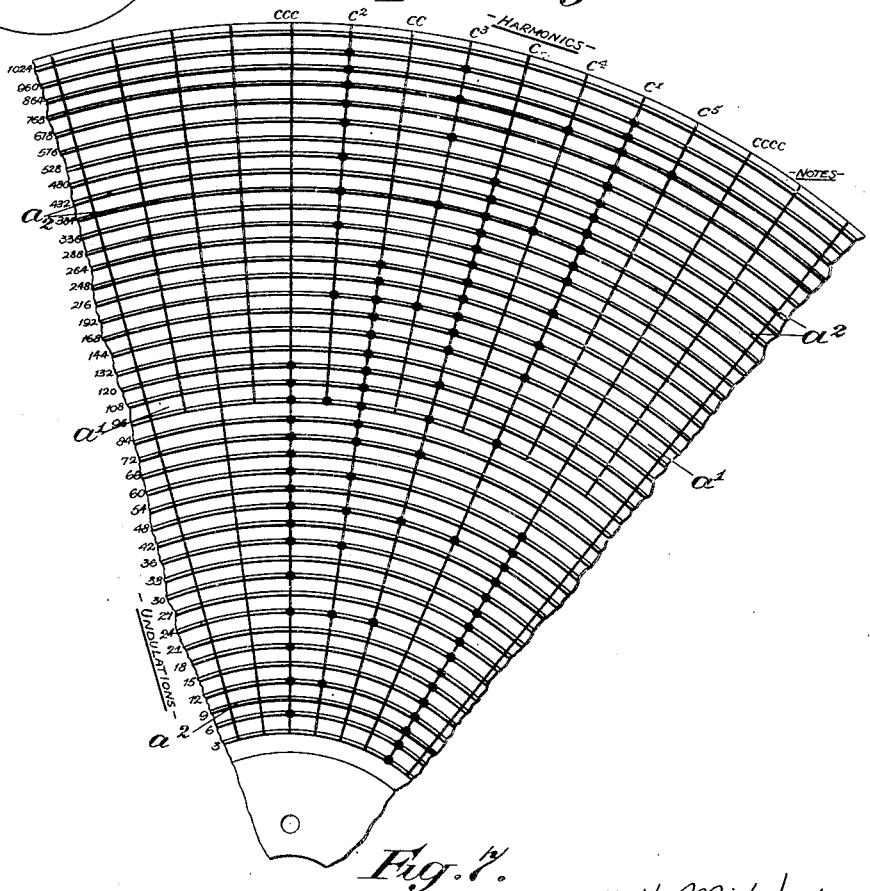

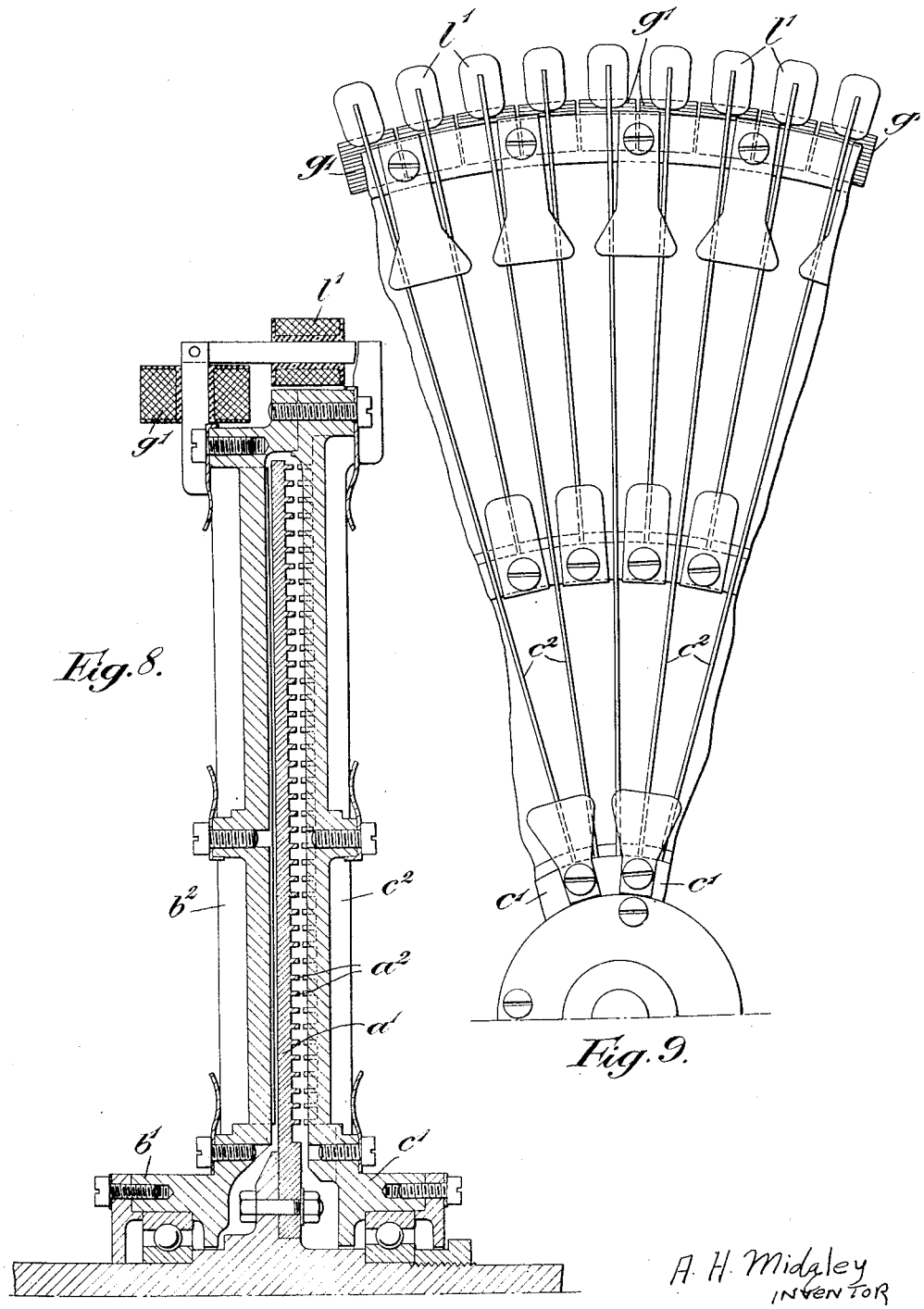

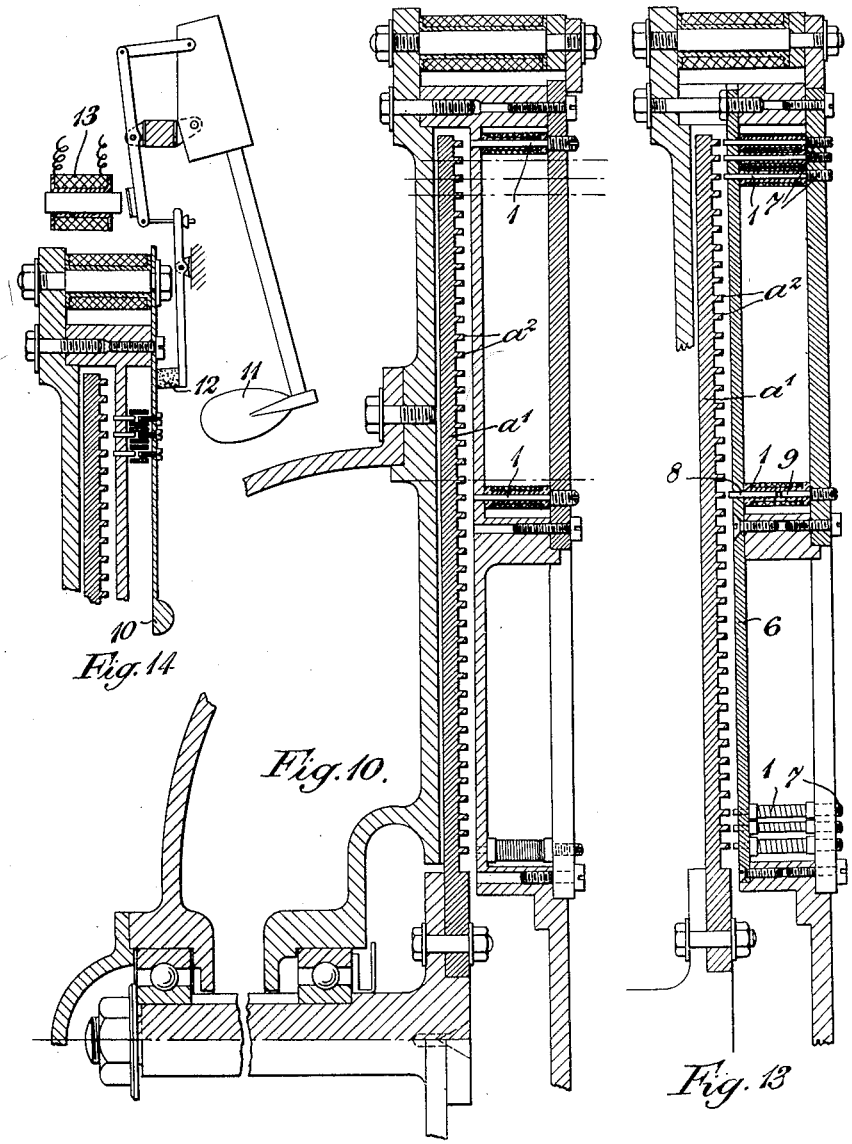

Patented Mar. 13, 1934

1,950,859

UNITED STATES PATENT OFFICE 1,950,859

APPARATUS FOR PRODUCING SOUNDS OF A MUSICAL CHARACTER

Albert Henry Midgley, Uxbridge, England

Application May 31, 1932, Serial No. 614,593
In Great Britain June 5, 1931

17 Claims. (Cl. 84—1)

This invention relates to sound producing apparatus and has for its object to devise improved apparatus whereby electrical vibrations of any desired controlled frequency and wave form may be produced and converted into sound waves, the invention being particularly designed to produce by all-electric means any musical notes or combinations of same such as might be produced by an ordinary organ, orchestra or the like.

The invention consists in an assemblage of electrical vibration producing devices geared together in a predetermined relationship so that the frequencies produced bear a predetermined relationship to one another and means for selecting any one or more of such frequencies and converting them into sound waves of corresponding frequency and wave form.

Thus when producing apparatus for producing ordinary musical sounds, the invention provides a series of fundamental vibrations the frequency of which shall progress geometrically, the difference between any two consecutive frequencies of any one series varying in the ratio of 1 to $$\sqrt[12]{2}$$

which is the interval of a semitone of the present-day equally-tempered musical scale, and combines with the same when so desired the correct harmonic frequencies to produce any quality of tone such as that given by an organ pipe or the instruments of an orchestra.

The invention also consists in an assemblage of geared spindles each provided with apparatus for producing electrical vibrations so arranged that the frequencies of the fundamental vibrations shall progress geometrically.

The invention also consists in means for producing a series of electrical vibrations the frequency of which shall progress arithmetically from the fundamental vibration.

The invention further consists in an assemblage of electrical vibration-producing devices geared together in a predetermined relationship so that the frequencies produced bear a predetermined relationship to one another, and means for selecting any one or more of such frequencies and converting them into sound waves of corresponding frequency and/or wave form, the amplitude of each fundamental or harmonic electrical vibration being adjusted by altering the reluctance of the path of its respective magnetic field characterized by the fact that instead of using a single note coil as described above I use a separate coil on each member or tooth of the note bar which I will term a "partial coil". These coils are connected in series.

Further I have found that by employing very weak fields the background noises are practically eliminated. The invention therefore further consists in using teeth or adjustable members having a cross-sectional area facing the ridges of less than 1/100 square inch.

The invention further consists in connecting all the partial coils belonging to a complete group of stops in series and in series with a resistance of about 250,000 ohms provided with a movable arm which is connected to the grid of the first valve of an amplifier, while the negative end of the resistance is connected to the filament of the amplifier, or alternatively it can be connected to the primary of a transformer, the secondary of which is connected to the amplifier.

By moving the arm over the resistance a diminuendo or crescendo effect can be produced.

The invention further consists in connecting together by an iron yoke all the energizing magnets of one disc so that there is one magnetic system to supply the fields for the various note members.

I may use a number of small energizing magnet cores and coils, or a single energizing coil, or I may use permanent magnets.

The invention consists in apparatus for producing sounds of a musical character as described above, wherein means are incorporated for screening or shielding the devices from which the electrical vibrations originate whereby undesired or parasitic vibrations are prevented.

The invention further consists in connecting for producing sounds of a musical character as indicated in the next preceding paragraph, wherein shields are provided to prevent the armatures or coils, which pick up the desired electrical vibrations, from receiving undesired or parasitic oscillations from stray magnetic fields, arising, for example, from the revolving disc whereby the desired notes are produced.

The invention further consists in apparatus for producing sounds comprising an assembly of electrical vibration-producing devices geared together in prearranged relationship relative to one another so that the frequencies produced are in prearranged relationship and means for selecting one or more of said frequencies and converting them into sound waves of corresponding frequencies and/or wave form, characterized in this that the electrical vibrations are induced in a coil or coils by variation of the magnetic flux passing therethrough, and that the reluctance of said flux path may be varied by field members (forming part or all of the path) mounted upon a vibratable support.

The invention further consists in apparatus for producing sounds, of the kind specified in the next preceding paragraph, wherein the electrical vibrations are produced by variations of the reluctance of the magnetic paths at the desired "note" frequency while their amplitude is varied (to produce the desired "percussion" effect) by variation of the reluctance of the magnetic paths by means of the vibrating field members.

The invention further consists in apparatus for producing sounds as indicated in the preceding paragraphs, wherein the field members are mounted (preferably adjustably in order that the amplitude of each fundamental or harmonic electrical vibration may be adjusted by altering the reluctance of its respective magnetic flux path) upon a plate or bar suitably supported at one or more points (e. g. one or both ends) so that it may be set into vibration by a blow from a hammer, or by magnetic means similar to those used in a common electric bell; or by any other suitable means.

The invention further consists in controlling means such as a keyboard or console and means for the conversion of the electrical vibrations into sound waves.

Further features of the invention will be apparent from the description given hereafter.

The accompanying drawings illustrate several modes of carrying out the invention.

Figure 1 is a diagram of one form of construction in accordance with the invention.

Figure 2 is a sectional elevation on a larger scale of a part shown diagrammatically in Figure 1. This view is taken along the line 2—2 of Figure 3.

Figures 3 and 4 are views taken from the left and right hand sides respectively of Figure 2, Figure 3 being a sectional view taken along the line 3—3 of Figure 2, while, Figure 4 is a view taken from the right-hand side of Figure 2;

Figure 6 is an electrical diagram illustrating a detail.

Figure 7 is a diagram of a part of a modified form of apparatus in accordance with the invention, and Figure 8 is a detail view in sectional elevation of a part of the said apparatus.

Figure 9 is a side view of a part of Figure 8 taken from the right-hand side of Figure 8.

Figure 10 is a side sectional elevation, similar to Figure 8, of part of a modified form of the invention; and Figures 11 and 12 are diagrams of electrical circuits for use with the device shown in Figure 10.

Figure 13 is a side sectional elevation of part of a further modification of the invention; and Figure 14 is a diagrammatic representation in side sectional elevation of part of yet another modification thereof.

Figure 15 represents in side elevation an undulated ridge upon the form of the invention shown in Figure 7;

Figure 16 represents a template employed to determine the size of the teeth of a pick-up comb for a particular tone value desired;

Figures 17 and 18 represent modifications of the invention, Figure 17 showing, in section, a cylinder with surrounding ridges, and Figure 18 discs with undulated edges adapted to take the place of a disc with concentric ridges as shown in Figure 7.

In carrying my invention into effect in one convenient manner as, for example, in its application to apparatus for producing organ music I provide an assemblage of, say 60, geared spindles arranged in 12 rows of 5 in each row, thus corresponding to 5 octaves with 12 semitones in each octave and represented in Figure 1 by the references C, C♯, D, D♯, E, F, F♯, G, G♯, A, A♯ and B. The end or first spindle of the first row C is geared to the end or first spindle of the second row C♯. The end of the second row is similarly geared to the third row and so on to the twelfth row B, the ratio of the gearing in each case being 196:185.

The speed of the second row will be $$\frac{196}{185}$$

times the speed of the first row and the speed of the third row will be $$\frac{196}{185}$$

times the speed of the second row, and so on, from which it will be seen that the speeds of the first spindles of each row are progressing geometrically at the ratio of $$\sqrt[12]{2:1}$$

and represent the twelve semitones of an octave namely, C, C♯, D, D♯, E, F, F♯, G, G♯, A, A♯, B.

Taking the spindles of each row the first spindle is connected to the second by a gear having a ratio of 2:1, the second is connected to the third by a similar 2:1 gear and so on to the fifth. This ratio in speed is the equivalent of an octave and therefore the spindles in the first row represent 5 C's an octave apart and those in the second row 5C♯'s an octave apart and so on for the twelve rows.

When power is applied to any one spindle the whole of the spindles rotate at speed in the exact ratio of the vibrations of the semitones of 5 octaves.

Figures 4, 17:
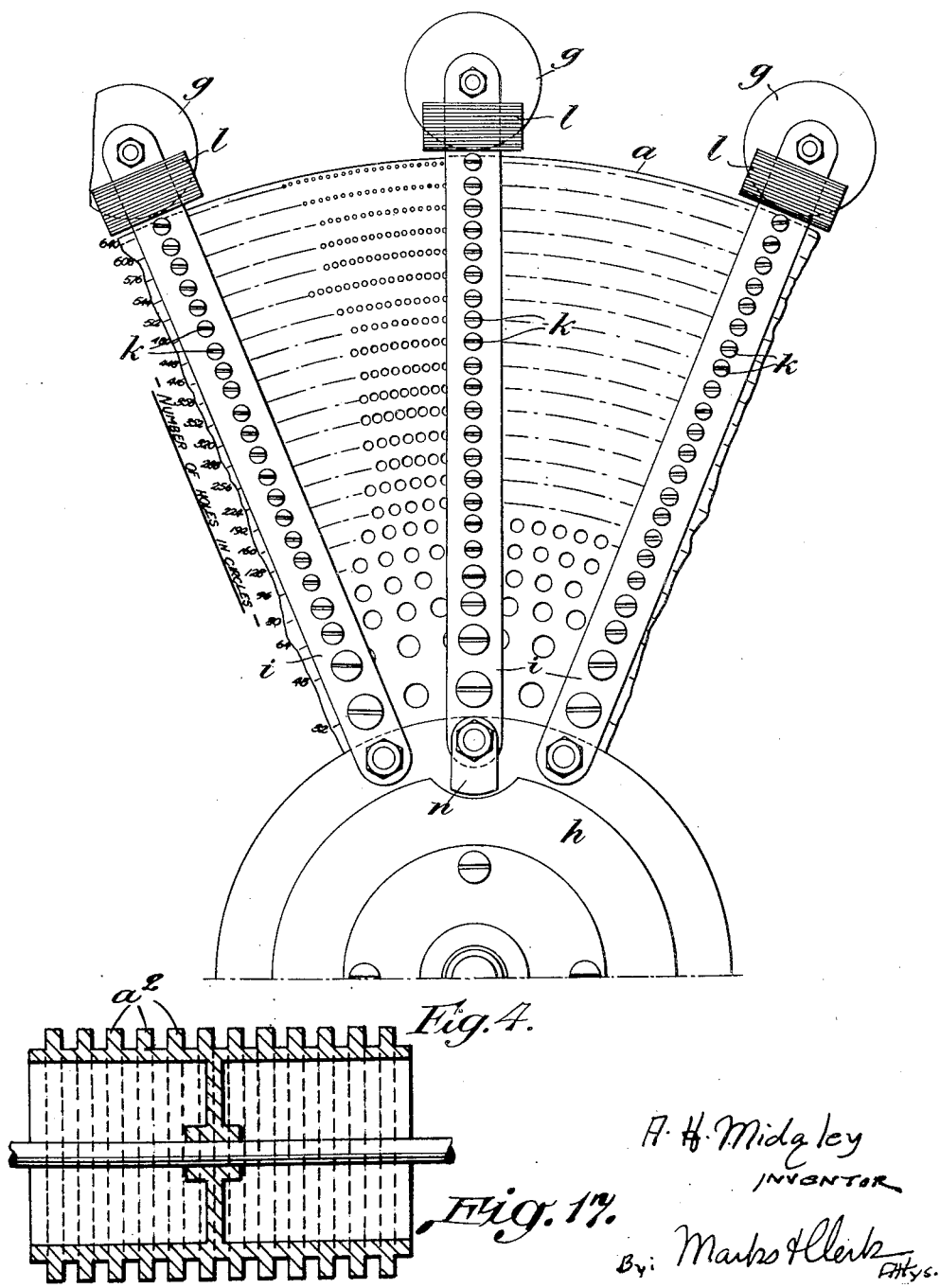

Mounted on each spindle is a circular iron or magnetic disc $a$ (Figures 2 and 4) of any suitable thickness, say 3/32" and provided with 22 concentric circles of holes, the number of holes in the inner circle being 32. Other circles contain holes numbering 64, 96, 128, increasing in arithmetical progression up to 640 holes in the outside circle as shown in Figure 4, while there are also two circles containing 48 and 80 holes respectively. The disc is held on its spindle by two cast iron drums or discs $b$ $c$ bolted together or by other suitable means and one bearing of the spindle is mounted in the centre of a circular aluminium casting or non-magnetic plate, spider or member $d$ to the inside face of which are fixed in a radial direction say 16 iron bars $e$ so arranged that the inner end of each bar is adjacent to but out of contact with the circumference of one iron drum $b$ supporting the disc. Adjacent to the other end of each of these radial bars is a further short bar $f$ held to the aluminium plate by means of the iron core of an electromagnet $g$ which for convenience I will term the "stop magnet". Each such short bar is so arranged that its contact with the corresponding radial bar can be altered thereby regulating the strength of magnetic field through the stop magnets.

On the side of the apertured disc $a$ remote from the aluminium plate and carrying the bearing at the opposite end of the spindle is an aluminium casting $h$ carrying 16 radial iron or magnetic bars $i$ the outer ends of which are supported by the cores of the stop magnets, these bars being spaced slightly apart from the face of the apertured disc and being termed the "stop bars". Projecting through each of the bars towards the face of the disc are a number of iron screws $k$, the centres of the several circular rows of screws being in register with the centres of the holes in the various circular rows of holes in the disc.

Mounted on the end of each stop bar near to the stop magnet is a small coil $l$ called the "note coil".

It will be seen that when a stop magnet is energized a magnetic field will be traversing from one end of the stop magnet to the radial iron bars on one side of the iron disc, through the cast iron drum, from the face of the disc to the iron screws back to the core of the electromagnet and if the apertured disc be now rotated the field passing through each screw will be varied according as the holes in the disc pass the ends of the screws.

Assuming that the first disc of the first row (C in Figure 1) revolves at the rate of ½ revolution per second, the first row of 32 holes will cause the field through the respective screw to fluctuate 16 times per second, thus producing 16 electrical vibrations or oscillations in the note coil at the end of the bar which is equivalent to the sound vibrations of the fundamental tone of the $C_3$ or 32 ft. pipe of an organ.

The ends of the screws are preferably so shaped that the wave form of these electrical oscillations is practically a pure sine wave.

This would produce a dull tone and in order to produce diapason, trumpet or other tones it is necessary to add certain harmonic tones. In the case of diapason tone 8 to 16 harmonics are necessary whereas for trumpet tone as many as 20 harmonics may be required.

These harmonic tones are produced by adjusting the other screws towards the face of the disc. For instance the screw opposite the circle of 64 holes will produce 32 vibrations a second, being the first harmonic or octave. Other screws will produce the various harmonics necessary and by regulating the distance these screws are from the face of the disc the amplitude of these harmonics can be separately adjusted in order to produce the exact tone required.

The adjustment of the screws may be readily effected by means of a pre-formed template and it will be seen that each bar and set of screws can be arranged to provide a distinct tone value.

Therefore it is possible with the arrangement described to produce 16 tone values equivalent to 16 stops of an organ and more or fewer tone values can be produced by a corresponding variation in the number of stop bars and associated parts.

By adjusting the movable bar $f$ on the aluminium disc or spider the field strength can be altered and the amplitude of the fundamental note together with its harmonics can be regulated in order to obtain an even power throughout the range of notes for each particular tone value or stop, and by varying the angular position of the stop bar screws the harmonics may be produced either in phase or out of phase with the fundamental.

If the stop bar screws on each disc are similarly adjusted then the apparatus is capable of giving vibrations equivalent to all the notes of 5 octaves and 16 tone values or stops.

In order to obtain higher octaves without increasing the speed of the last spindle or adding further gears and spindles, additional discs $m$ (Figure 1) can be mounted on the fifth spindle in each row and the screws registering with the circle containing the necessary number of holes to give the fundamental note can be adjusted.

For instance taking a second disc to give one octave higher, the screw opposite the 32 hole circle is omitted and the screw opposite the 64 hole circle would be adjusted for the fundamental note, those for the correct harmonics being chosen in suitable order.

If three additional discs are mounted on the fifth spindle of each row the apparatus has a range of 8 octaves and due to the gearing every note will always be perfectly in tune.

The two circles of holes containing 48 and 80 holes respectively are to produce the fundamental note of stops called the "quint" or fifth and the tenth which are used in combination with other stops and also to alter the tone value of other stops or combinations.

In order to produce a "celeste" effect the drum $c$ supporting the iron disc which is nearest the stop bar has its circumference shaped in the form of an ellipse (identical with the shape of the disc $o^2$ shown in Figure 6 for example) and a short iron bar $n$ is fixed on the inside end of each stop bar so that any such bar can be adjusted adjacent to the circumference of the drum thereby causing the field through the disc and screws of the particular bar to be by-passed twice every revolution.

This will produce an undulating note the amplitude of which will vary twice for each revolution of the disc and the undulations or tremolo effect will increase from note to note.

In order to produce a tremolo effect on the whole range of stops or any particular stop or range I connect in series with the current supply and the magnet coils $g'$ (Figure 6) of the stop bars to be affected a coil $o$ on the connecting limb of a U-shaped iron core $o'$ between the poles or the two limbs of which rotates an elliptical or other shaped armature $o^2$ which superimposes a fluctuating current on the supply circuit, thus causing the fields of all these magnets to vary at a given rate per second.

This armature and apparatus can be mounted on any spindle giving the desired rate of tremolo effect.

In order to prevent an alteration in the overall amplitude of the vibration when the tremolo apparatus is connected due to the resistance of the coil, a permanent resistance $p$ having a value equal to the resistance of the coil is connected in series with the stop magnet coils and a two-way switch $p'$ enables either the resistance $p$ or tremolo coil $o$ to be connected in circuit. A resistance $p^2$ of much higher value is connected between the two contacts of the switch so as to make the application of the tremolo unnoticeable.

In order to produce a diminuendo or crescendo effect on all or some of the stops a variable resistance $p^3$ is connected in series with the supply to the various stop magnet coils so that the current can be diminished or increased thereby altering the amplitude of the electrical vibrations, the variation of the resistance being effected by a pedal or other suitable means.

Figure 5:
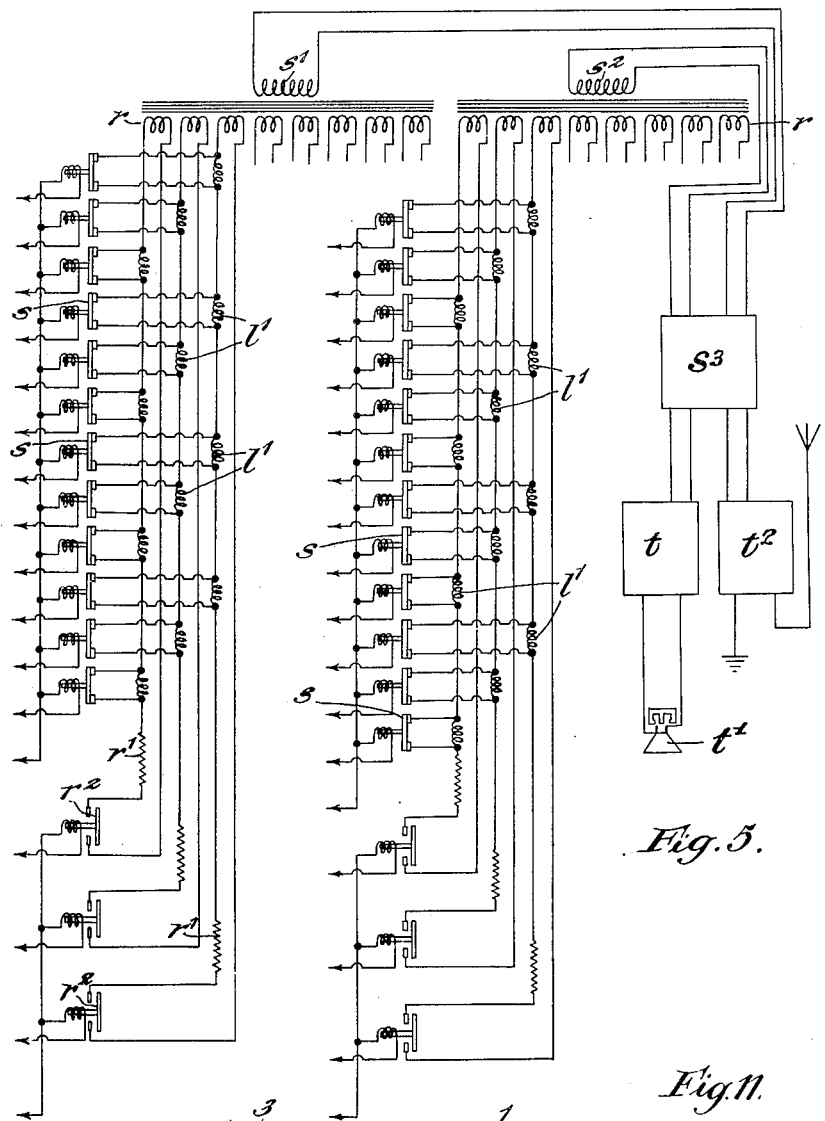
Figure 5 is a diagram of the electrical connections of the apparatus.

As shown in Figure 5, all the note coils of one particular stop are connected in series and also in series with a primary coil $r$ of a transformer common to half the stops. A resistance $r'$ of about 10,000 ohms is also connected in series and a switch $r^2$ to close the loop circuit. The switch is of the magnetic type operated from the keyboard or console so that any particular stop can be brought in action by closing the loop circuit.

Each note coil is provided with a magnetic switch $s$ which in its normal position short circuits the coil. These switches are connected by way of any usual or desired relays to the keys so that when a key is depressed the switch opens and allows the coil to come into action.

The other half of the stop magnets and note coils (shown in the lower part of Figure 5) are connected in a similar way to another keyboard or manual and those notes of pitches equivalent to those of 32 ft. and 16 ft. pipes of the ordinary pipe organ are connected in similar manner to the pedals of the console.

The secondaries $s'$, $s^2$ of these transformers are connected to any usual form of mixing circuit $s^3$ and then to the amplifier $t$ which supplies energy to the loud speaker $t'$.

The mixing circuit can also be connected to a modulator amplifier $t^2$ and then to a radio transmitter in the usual manner.

I may so shape the holes or screws or the edge or face of the discs as to produce wave form of special shape with fundamental and harmonic tones.

Figures 7, 8 and 9 show a modified form of apparatus in which I require only 12 devices geared together so that the speed ratio between two consecutive devices is in the ratio of 1 to $$\sqrt[12]{2}$$

to produce the 12 semitones of the musical scale together with the full number of octave notes to complete the full range of the apparatus. In this arrangement I provide 12 geared spindles corresponding with the 12 semitones of an octave, the gearing being in each case in the ratio 196:185. Thus the speeds of the spindles are progressing geometrically at the ratio of $$\sqrt[12]{2}:1$$

and represent the twelve semitones of an octave namely, C, C♯, D, D♯, E, F, F♯, G, G♯, A, A♯, B.

Figure 7 is a diagrammatic representation of a disc of this character, Figures 8 and 9 representing the actual apparatus employed. In Figure 7 the figures on the left-hand side represent the number of undulations on each ridge, while the radial lines represent the positions of the iron strips. The dots at various points of intersection of the radial lines and ridges represent the different teeth necessary on the strips to produce a fundamental note and harmonics as indicated at the end of each radial line.

When power is applied to any one spindle the whole of the spindles rotate at speeds in the exact ratio of the vibrations of the semitones of an octave.

Mounted on each spindle is a circular iron or magnetic disc $a'$ of any suitable thickness, say $\frac{3}{16}''$, and provided with 41 concentric circular projections or ridges $a^2$ say $\frac{1}{16}''$ thick projecting $\frac{1}{8}''$ above the face of the magnetic disc.

The faces of these ridges are undulating having troughs and crests shaped according to a sine wave form as shown in Figure 15. The number of undulations on the face of the ridges is as follows, commencing with the inner ridge:

| Ridge | Undulations | Ridge | Undulations | Ridge | Undulations |
|---|---|---|---|---|---|
| 1 | 4 | 15 | 112 | 29 | 384 |
| 2 | 8 | 16 | 120 | 30 | 416 |
| 3 | 16 | 17 | 128 | 31 | 448 |
| 4 | 24 | 18 | 144 | 32 | 480 |
| 5 | 32 | 19 | 160 | 33 | 512 |
| 6 | 40 | 20 | 176 | 34 | 576 |
| 7 | 48 | 21 | 192 | 35 | 640 |
| 8 | 56 | 22 | 208 | 36 | 704 |
| 9 | 64 | 23 | 214 | 37 | 768 |
| 10 | 72 | 24 | 240 | 38 | 832 |
| 11 | 80 | 25 | 256 | 39 | 896 |
| 12 | 88 | 26 | 288 | 40 | 960 |
| 13 | 96 | 27 | 340 | 41 | 1024 |
| 14 | 104 | 28 | 352 | | |

One bearing of the spindle is mounted in the centre of a circular aluminium casting or non-magnetic plate or member $b'$ provided with 90 radial slots about $\frac{1}{32}''$ wide. In each slot is fixed an iron strip $b^2$ so arranged that the air gap between the edge of the strip and the disc can be varied so as to vary the amount of magnetic flux passing through the strip.

Fixed to the outer end of each strip is an iron core on which is mounted a small coil $l'$ which for convenience I will term the "note coil".

On the end of the radial strip is mounted a coil $g'$ for energizing the strip which I will call the "stop coil".

On the ridged side of the disc $a'$ remote from the aluminium plate and carrying the bearing at the opposite end of the spindle is an aluminium casting $c'$ also provided with 90 radial slots about $\frac{1}{32}''$ wide.

In each slot is fixed an iron strip $c^2$, the outer ends of which are fixed to the cores of the note coils.

These strips are spaced slightly apart from the face of the ridges on the disc and are termed the "note strips". They are provided with narrow tooth-like projections, the centres of the several teeth being in register with the centres of the various circular ridges on the face of the disc.

When a stop coil is energized it will produce a magnetic field traversing from the ridges on the disc to the teeth on the note strip, through the core of the note coil and back to the disc by way of the strips in the other aluminium casting.

If the ridged disc be now rotated the field passing through each tooth will be varied according as the undulations of the ridges pass the ends of the teeth.

Assuming that the first disc revolves at the rate of 4 revolutions per second, the second ridge will cause the field through the respective tooth to fluctuate 32 times per second, thus producing 32 electrical vibrations or oscillations in the note coil at the end of the strip which is equivalent to the sound vibrations of the fundamental tone of the C₃ 16 ft. pipe of an organ.

This would produce a dull tone and in order to produce diapason, trumpet or other tones it is necessary to add certain harmonic tones. In the case of diapason tone at least 8 harmonics are necessary whereas for trumpet or reed tone as many as 16 are required.

These harmonic tones are produced by providing the note strip with a certain number of teeth. For instance, the tooth opposite the third ridge would produce 64 vibrations a second, being the first harmonic octave. Other teeth will produce the various harmonics necessary and by regulating the distance the face of these teeth are from the face of the ridges the amplitude of these harmonics can be separately fixed in order to produce the exact tone required.

The correct determination of the size of these teeth may be readily effected by means of a preformed template in the manner shown in Figure 16 and it will be seen that each strip and set of teeth can be arranged to provide a distinct tone value.

As the pitch of the note increases especially in the top octaves fewer harmonics are necessary and as the first ridge gives the fundamental note of $C_4$ so a note strip with its teeth commencing at ridge No. 2 will give the fundamental note of $C_3$. Similar note strips with their teeth arranged accordingly for ridge 3 would give $C_2$, ridge 5 would give tenor C, ridge 9 middle C, ridge 17 treble $C^2$, ridge 25 $C^3$, ridge 33 $C^4$ and ridge 41 $C^5$.

All the 12 discs and note strips can be of similar construction and as the ratio of gearing in each case is $$\sqrt[12]{2:1}$$

and represents a semitone of an octave the second disc will produce 9 C♯'s corresponding to the 9 C's of the first disc. The third disc will produce 9 D's and so on. The arrangement described with 9 note strips per disc will produce 9 octaves of one tone value. All stops in an organ are not required to cover the full range of 9 octaves.

The following is a specification for an organ having 14 tone values which can be produced from the apparatus described:

1st Manual

| | $C_2$ | $C_1$ | C | c | $c^I$ | $c^{II}$ | $c^{III}$ | $c^{IV}$ | $c^V$ | Number of note strips in use for each tone value |
|---|---|---|---|---|---|---|---|---|---|---|
| Great diapason | | | | X | X | X | X | X | | 5 |
| Small diapason | | | X | X | X | X | X | X | | 7 |
| Contra bass | | | X | X | X | | | X | | 3 |
| Tibia | X | X | X | X | X | X | X | X | | 8 |
| Dulciana | | | X | X | X | X | X | X | | 7 |
| Hohflute | | | X | X | X | X | X | X | | 7 |
| Tuba | | X | X | X | X | X | X | | X | 7 |
| Clarinet | | X | X | X | X | X | X | | | 6 |
| Total | | | | | | | | | | 50 |

2nd Manual

| | $C_2$ | $C_1$ | C | c | $c^I$ | $c^{II}$ | $c^{III}$ | $c^{IV}$ | $c^V$ | Number of note strips in use for each tone value |
|---|---|---|---|---|---|---|---|---|---|---|
| Diapason | | | X | X | X | X | X | X | | 6 |
| Violone | | X | X | X | X | X | X | | | 6 |
| Viol | | | X | X | X | X | X | X | X | 7 |
| Gedackt | | X | X | X | X | X | X | X | X | 8 |
| Oboe | | X | X | X | X | X | X | | | 6 |
| Trumpet | | X | X | X | X | X | X | X | | 7 |
| Total | | | | | | | | | | 40 |

It is possible to provide two or more complete discs on each spindle and thereby increase the number of tone values or stops if necessary.

By adjusting the movable iron strip on the aluminium plate in relation to the disc on the spindle as previously described the field strength can be altered and the amplitude of the fundamental note together with its harmonics can be regulated in order to obtain an even power throughout the range of notes for each particular tone value or stop.

It is advisable to arrange that the amplitude of the undulations on the ridges gradually increases from the outside ridge to the inside ridge; also the ridges corresponding to the fundamental note vibrations can be made wider than those for the harmonic vibrations.

The several note coils are preferably connected to the amplifiers and loud speaker as described in connection with the previous modification.

The stop coils and note coil operating switches are connected to the console or key board in the usual known manner; preferably these are connected on what is known as the "extension system" so that each stop can be drawn or played in various pitches. For instance, the tibia on the 1st manual can be played in 32 ft. and 16 ft. pitch on the pedals and 16 ft., 8 ft. and 4 ft. pitch on the manuals. Also it may be playable on more than one manual in various pitches.

I may so shape the undulations in the ridges of the discs as to produce wave forms of special shape with fundamental and one or more harmonic tones.

I have described the second modification of the invention with undulating ridges on the face of a disc but it is obvious that I may use a cylinder $a^2$, as shown in section in Figure 17, the ridges being undulated in the manner shown in Figure 15 with ridges or there may be used a series of thin discs as shown in Figure 18 with the undulations on their circumferential edges of the character shown in Figure 15. These equivalent modifications may be used without departing from the invention.

In this case instead of connecting all the note coils of one tone value in series with the loop circuit of the primary of a transformer a separate transformer is used for each octave or series of notes and these particular series of notes only are connected in series with the transformer primary.

Figure 11:
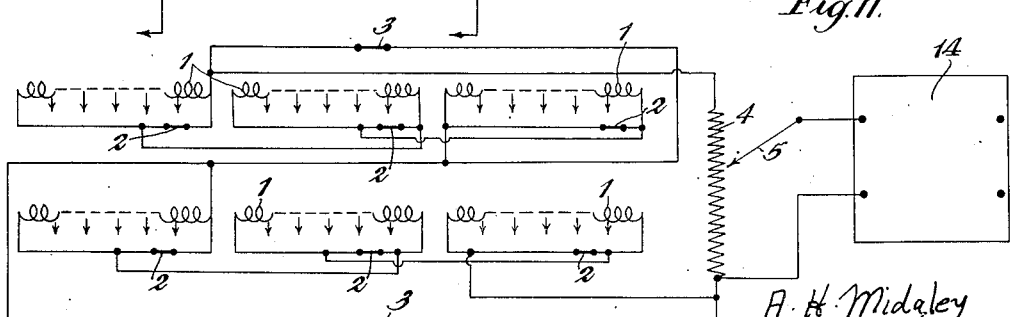

In a modification of the invention shown in Figure 10 I construct my apparatus with a number of geared spindles each carrying a disc with a number of concentric ridges or projections much in the manner described above, or I may use the pin members described above, but in either case the dimensions of the teeth or pin members are much reduced so as to be comparable with that of a needle point. Moreover, in place of employing a single note coil for each note bar, I provide a separate small coil 1 (termed partial coil) for each tooth or pin, the partial coils are connected in series (as shown in Figure 11), and I provide a note key switch 2 in association with the partial coils for each note, and a stop key switch 3 in association with the coils of all the notes of each stop. All the partial coils belonging to a complete group of stops are connected in series with one another and with a high resistance 4 (say about 250,000 ohms) with which is associated a movable arm 5 connected to the grid of the first valve of the amplifier 14 (Figure 11). The resistance may be in the form of a potentiometer and may be used for producing "crescendo" and "diminuendo" effects. Alternatively I may connect the arm and negative side of the potentiometer to the primary winding of a transformer, the secondary winding of which is connected to the grid and filament of the amplifier 14 (as shown in Figure 12). This transformer is similar to the one shown in Figure 5, but instead of having one primary winding for each stop there is only one primary winding for each group of stops which are controlled by the same diminuendo and crescendo apparatus.

In the usual cinema organ there are generally two chambers, so that the stops can be divided into two groups (Figure 12).

It has been found that in apparatus of the kind described above a large amount of noise or background occurs, particularly in the top register, arising apparently from the note coils 1 picking up stray magnetic fields from the revolving disc and converting them into electric impulses. In one convenient modification shown in Figure 13 this trouble is avoided by providing in front of the revolving disc a soft iron plate 6 through which the pins or screws project towards the holes or ridges on the revolving disc. This plate may carry centrally the bearings upon which the spindle of the revolving disc is mounted and may also form a support for the other parts of the apparatus which support the different soft iron magnetic members. These additional supporting parts were described above as made of aluminium, but they may, if desired, or to improve the screening effect towards which this modification is directed, be made of iron.

Means are provided for adjusting the positions of the various pins or screws relative to the revolving disc in order to adjust the reluctance of the path of each of them, thus modifying the overall effect obtained from all those in one arm. These means may consist in screw-threaded arrangements 7 whereby the pins and screws may be advanced or withdrawn in the iron bar carrying them relative to the revolving disc as shown. A modification of this adjustment may be employed, comprising a pin 8 fixed in the stationary iron plate 6 forming the shield extending rearwardly through a portion of the partial coil 1 adapted to pick up the impulses induced in the pin. Through the remaining part of this coil extends a core 9 projecting into the supporting bar forming the outer limb of the magnet and adjustable therein by means of a screw or screw-threaded engagement. It will be seen, therefore, that the core of each partial coil comprises a fixed portion 8 forming the pin and a movable portion 9 between which portions a small air gap exists. Variations of this air gap will modify the reluctance of the path in the desired manner.

A further modification of the invention shown in Figure 14 aims at providing a device for producing various tones originating in an orchestra from the percussion instruments such as the drums, piano, bells, etc.

In this modification the outer iron member of the electromagnet comprises a thin flat strip or plate of iron or other magnetic material and is supported so that it may vibrate. For example, it may be supported at one end or at both ends or at one or more points along its length. If it is supported only at one end, for example by the screw securing it to the magnetic core about which the energizing coil is wound, it is preferable to load the plate at its free end with a small weight 10 so that its natural frequency is equal to the frequency of the fundamental note which it is intended to produce. Mounted close to the plate is a hammer 11 similar to the ordinary pianoforte hammer and a damper 12 and these are operated by the keyboard of the organ, the keys of which energize one or more magnets 13 which attract the hammer thereby causing it to strike a sharp blow on the plate. At the same time a damper 12 is lifted by the magnet.

Instead of a sustained note a vibrating tone is now produced due to the effect of the vibrating plate varying the reluctance of the path of the several magnetic fields which produce the fundamental and harmonic tones.

It will be seen that if the fundamental frequency is generated by the rotating disc at the free end of the bar this frequency will be the last to die out, but I may arrange to fix the bar at the opposite end so that the higher harmonic frequencies are the last to die out.

In order that the tone may die away after this bar has been struck by the hammer the screws in the vibration plate are adjusted so that the air gap between the end of the screw and the pin is sufficiently clear to prevent the passage of a magnetic field of sufficient strength to enable the revolving disc to produce an electrical vibration when the plate is at rest.

If on the other hand it is required that after the plate has been put into vibration the note shall be sustained so long as the key remains held down, the screws are adjusted nearer to the pins in order that the strength of the magnetic fields will suffice for a note to be produced when the vibration bar is at rest.

I may arrange a pedal to the dampers so that these can be held off and thereby sustain the vibrations similar to the sustaining pedal of a pianoforte. In this case, the pedal may be arranged so that it will keep the note coil, or coils, in circuit with the amplifier after the key has been released.

In producing the tones of bells I may provide ridges on the rotating disc capable of giving frequencies which are not a multiple of the fundamental in order to get the correct tone. The note coils may be connected to the console of an organ as described above, and the invention is not limited to any special form of coupling between the apparatus and the amplifier and loud speakers, to which the currents induced in the note coils are led and converted into sound.

For some effects which it is desired to obtain, such as simulation of a drum, it is necessary to produce only one frequency and only one revolving disc is therefore necessary. Where, however, it is desired to imitate a percussion instrument having more than one note, several such revolving discs may be geared together in such a way that they revolve at speeds related to one another in the same ratios as the various fundamental tones and semitones it is desired to produce. In this respect also the arrangement is identical with that described above.

Since the invention consists broadly in producing electrical vibrations of predetermined frequencies and selecting any one or more of such frequencies at will for conversion into sound waves I may employ any suitable electric or magnetic or other means for producing the vibrations and any suitable means for converting the same into sound waves and the invention is therefore not to be limited to the foregoing details of construction which are given purely by way of example. Further, I may provide for any desired range of frequencies and may employ other methods for producing celeste, tremolo, crescendo and other desired effects.

I claim:

1. Apparatus for producing sounds of a musical character comprising an assembly of rotatable electromagnetic devices for producing fundamental and harmonic electrical frequencies, means forming parts of various magnetic paths associated with said electromagnetic devices whereby the values of reluctance of said paths and thereby the relative amplitudes of the various fundamental and harmonic frequencies are determined, and means for selecting any number of said frequencies and converting them into sound waves of corresponding characteristics.

2. Apparatus for producing sounds of a musical character comprising an assembly of rotatable electromagnetic devices for producing fundamental and harmonic electrical frequencies, adjustable means forming parts of various magnetic paths associated with said electromagnetic devices whereby the values of reluctance of said paths and thereby the relative amplitudes of the various fundamental and harmonic frequencies are adjusted and means for selecting any number of said frequencies and converting them into sound waves of corresponding characteristics.

3. Apparatus for producing sounds of a musical character comprising an assembly of geared spindles, a disc mounted on each spindle, each disc having variations in thickness periodically arranged along each of a plurality of concentric circles about its spindle, means for providing a plurality of magnetic fields within which said discs are rotated, and means for controlling the reluctance of the path of each magnetic field.

4. Apparatus for producing sounds of a musical character comprising an assembly of geared spindles each carrying a disc provided with a plurality of concentric rows of different numbers of holes, each disc being rotatable, by means of said spindles, in a plurality of magnetic fields formed by a member carrying a number of adjustable pins radially disposed to register with said rows of holes.

5. Apparatus according to claim 4 wherein said pins are adjusted in accordance with a preformed template which determines the amplitude of each electrical vibration by fixing the reluctance of the various magnetic paths through the pins.

6. Apparatus for producing sounds of a musical character comprising an assembly of geared spindles, each carrying a disc provided with a plurality of concentric ridges, the faces of which are of an undulatory form, each disc being rotatable by means of said spindles in a plurality of magnetic fields formed by a strip having ridges disposed thereon at distances from the spindle substantially equal to the radial distances of the ridges on the disc.

7. Apparatus for producing sounds of a musical character comprising means for producing a plurality of magnetic fields across an air gap having a common return path or yoke and a common source of energization, the strength of said magnetic fields each being subject to a periodic variation due to periodic variations of the width of said air gap, and means for producing electrical oscillations having a complex wave form built from the combined action of variations of said magnetic fields, and the amplitudes of said electric oscillations being controlled by means for adjustment of the values of the reluctance of the magnetic field paths employed.

8. Apparatus according to claim 7 wherein the reluctance of each magnetic field path can be adjusted separately to modify the wave form of the resultant electric oscillation.

9. Apparatus according to claim 7 wherein the reluctances of the magnetic field paths employed for any complex oscillation may be adjusted to vary the amplitude of the resultant oscillation without altering its wave form.

10. Apparatus for producing sounds of a musical character comprising means adapted to move in a plurality of magnetic flux paths and to modify the fluxes thereof at frequencies corresponding respectively to a fundamental note, its harmonics and sub-harmonics, said flux paths being formed of pins of magnetic material each surrounded by an electric coil in which electric oscillations are induced by said flux variations, and all coils corresponding to one fundamental and its desired harmonics and sub-harmonics being connected together in series, and means to prevent generation in said coils of undesired parasitic electrical vibrations, comprising a magnetic shield interposed between said pick-up coils and other parts of the apparatus to screen the coils from irrelevant variations of magnetic flux caused thereby.

11. Apparatus according to claim 7 provided with means for producing effects similar to percussion instruments in an orchestra.

12. Apparatus according to claim 7 wherein said means for producing a plurality of magnetic fields are mounted on a vibratable support.

13. Apparatus for producing sounds of a musical character comprising means adapted to move in a plurality of magnetic flux paths and to modify the fluxes thereof at frequencies corresponding respectively to a fundamental note, its harmonics and sub-harmonics, said flux paths being formed of pins of magnetic material each surrounded by an electric coil in which electric oscillations are induced by said flux variations, and all coils corresponding to one fundamental and its desired harmonics and sub-harmonics being connected together in series, said magnetic pins being carried by an elastic magnetic bar which is mounted so that, by means of a hammer provided, it may be set into vibration.

14. Apparatus according to claim 13 provided with damping means to control said vibration of the magnetic bar.

15. Apparatus according to claim 7 provided with means for producing a "celeste" effect.

16. Apparatus according to claim 7 provided with means for producing a tremolo effect.

17. Apparatus according to claim 7 provided with means for varying the volume of the sounds produced.

ALBERT HENRY MIDGLEY.